(12) United States Patent
Yokono

(10) Patent No.: US 8,428,369 B2
(45) Date of Patent: Apr. 23, 2013

(54) INFORMATION PROCESSING APPARATUS, INFORMATION PROCESSING METHOD, AND PROGRAM

(75) Inventor: Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 270 days.

(21) Appl. No.: 13/022,900

(22) Filed: Feb. 8, 2011

(65) Prior Publication Data

US 2011/0222759 A1    Sep. 15, 2011

(30) Foreign Application Priority Data

Mar. 9, 2010  (JP) ................. 2010-051361

(51) Int. Cl.
*G06K 9/62*    (2006.01)

(52) U.S. Cl.
USPC ........... 382/209; 382/154; 382/118; 382/228; 701/301; 701/13; 340/961; 340/963

(58) Field of Classification Search ............. 382/209, 382/154, 118, 228; 701/301, 13; 340/961, 340/963
See application file for complete search history.

(56) References Cited

U.S. PATENT DOCUMENTS

| | | | | |
|---|---|---|---|---|
| 8,041,509 B2 * | 10/2011 | Alfano | ........................ | 701/301 |
| 2010/0135541 A1 * | 6/2010 | Lai et al. | ...................... | 382/118 |

OTHER PUBLICATIONS

Peter Foldiak, "Learning Invariance from Transformation Sequences", Neural Computation, vol. 3, 1991, pp. 194-200.

Dileep George, "How the Brain Might Work: A Hierarchical and Temporal Model for Learning and Recognition", PHD Thesis of Dileep George, Jun. 2008, 191 Pages.

* cited by examiner

*Primary Examiner* — Mike Rahmjoo
(74) *Attorney, Agent, or Firm* — Oblon, Spivak, McClelland, Maier & Neustadt, L.L.P.

(57) ABSTRACT

An information processing apparatus includes a characteristic amount calculating unit calculating a characteristic amount for each of a plurality of n different image patterns, a specifying unit specifying a best-matching image pattern among the plurality of n image patterns for each of frames forming a learning moving picture and having temporal continuity, a computing unit computing a collocation probability Pij indicating a probability that, for a frame located at a position where a temporal distance to a frame for which a first image pattern Xi is specified among the plurality of n image patterns is within a predetermined threshold τ, a second image pattern Xj is specified among the plurality of n image patterns, and a grouping unit grouping the plurality of n image patterns by using the computed collocation probability Pij.

9 Claims, 13 Drawing Sheets

INFORMATION PROCESSING APPARATUS, INFORMATION PROCESSING METHOD, AND PROGRAM

BACKGROUND OF THE INVENTION

1. Field of the Invention

The present invention relates to an information processing apparatus, information processing method, and program and, in particular, an information processing apparatus, information processing method, and program suitable for use when an object on an image is recognized.

2. Description of the Related Art

In the related art, there is a technique for recognizing an object that is present on an image (a still picture or a moving picture). In an example of a method for this technique, an observation window is provided on an image, a characteristic amount of an area of the observation window is calculated, and the calculation result is compared with a characteristic amount of each pattern prepared in advance correspondingly to each of various existing objects to specify a best-matching pattern for each regional block.

However, when an object having a joint, for example, a human knee, is to be recognized from a moving picture, as depicted in FIG. 1, that object not only moves but makes more complicated motions. Therefore, when that object is a focus of attention and the state is compared with a state thereafter with reference to its state at a time t1, a correlation value gradually decreases as depicted in FIG. 2 in spite of the same object, thereby causing a pattern specified at each time to be varied. That is, for an image of a knee at the time t1, a pattern with a characteristic amount x1 (hereinafter also referred to as a pattern x1, and the same goes for other patterns) is specified. For an image of the knee at a time t2, a pattern x2 with a characteristic amount x2 is specified.

The characteristic amounts x1 to x4 of each pattern have different values as indicated by part A in FIG. 3. However, as described above, in order to make the pattern identified as the same object (the human knee), some transformation (such as a projection function) or grouping is used to gather the characteristic amounts x1 to x4 indicated by part A in FIG. 3 onto an invariable characteristic amount space indicated by part B in FIG. 3 to learn that the gathered amount represents a characteristic amount corresponding to the same object.

Thus, in the related art, as a method of grouping different patterns by learning, a method has been suggested in which a pattern is learnt by using a temporal change of an image extracted from an observation window provided so as to be positionally fixed on each frame of a learning image (a moving picture).

For example, in a method described in Learning Invariance from Transformation Sequences, Peter Foldiak, Neural Computation, 1991, a response of a pattern is temporally continued. Thus, a weight is learnt so that a response is made with the same pattern even when a slightly changed pattern comes.

In PHD Thesis of Dileep George, "How The Brain Might Work: A Hierarchical and Temporal Model for Learning and Recognition", grouping of patterns is performed based on a temporal transition of a regional block.

SUMMARY OF THE INVENTION

In the method described in the above cited document "Learning Invariance from Transformation Sequences", only a regional input is focused. Therefore, the method has a disadvantage of vulnerability to noise included in a moving picture.

In the method described in the above cited document "How The Brain Might Work: A Hierarchical and Temporal Model for Learning and Recognition", although the method is based on a temporal transition of a regional block, a relation between adjacent frames is used merely in one direction, and the pattern grouping method is susceptible to improvement.

It is desirable to optimize pattern grouping by bidirectionally using a relation between frames that are temporally close to each other, thereby allowing an object on an image to be recognized with high accuracy.

An information processing apparatus according to an embodiment of the present invention includes characteristic amount calculating means for calculating a characteristic amount for each of a plurality of n different image patterns, specifying means for specifying a best-matching image pattern among the plurality of n image patterns for each of frames forming a learning moving picture and having temporal continuity, computing means for computing a collocation probability Pij indicating a probability that, for a frame located at a position where a temporal distance to a frame for which a first image pattern Xi is specified among the plurality of n image patterns is within a predetermined threshold τ, a second image pattern Xj is specified among the plurality of n image patterns, and grouping means for grouping the plurality of n image patterns by using the computed collocation probability Pij.

The computing means can compute the collocation probability Pij by sequentially setting each of the frames of the learning moving picture as a reference frame, taking an image pattern specified for the reference frame as the first image pattern Xi, counting a number of frames for which the second image pattern Xj is specified among a plurality of frames positioned within a temporal distance equal to or smaller than the predetermined threshold τ before and after the reference frame, and totalizing the counted value every time the reference frame is reset.

The computing means can compute the collocation probability Pij by sequentially setting each of the frames of the learning moving picture as a reference frame, taking an image pattern specified for the reference frame as the first image pattern Xi, counting a number of frames for which the second image pattern Xj is specified among a plurality of frames positioned within a temporal distance equal to or smaller than the predetermined threshold τ before and after the reference frame by weighting according to a temporal distance to the reference frame, and totalizing the counted value as being weighted every time the reference frame is reset.

The grouping means can group the plurality of n image patterns by applying spectral clustering to the computed collocation probability Pij.

The information processing apparatus according to the embodiment of the present invention can further include image pattern generating means for generating the plurality of n image patterns by extracting a regional block of a predetermined size from a plurality of n different positions of a pattern image.

The information processing apparatus according to the embodiment of the present invention can further include recognizing means for specifying a best-matching image pattern for an image to be recognized among the grouped plurality of n image patterns and recognizing an object on the image to be recognized based on the specifying result.

An information processing method according to another embodiment of the present invention for an information processing apparatus grouping image patterns corresponding to a same object includes the steps of, by the information processing apparatus, calculating a characteristic amount for each of a plurality of n different image patterns, specifying a best-matching image pattern among the plurality of n image patterns for each of frames forming a learning moving picture and having temporal continuity, computing a collocation probability Pij indicating a probability that, for a frame located at a position where a temporal distance to a frame for which a first image pattern Xi is specified among the plurality of n image patterns is within a predetermined threshold τ, a second image pattern Xj is specified among the plurality of n image patterns, and grouping the plurality of n image patterns by using the computed collocation probability Pij.

A program according to still another embodiment of the present invention is a control program for an information processing apparatus grouping image patterns corresponding to a same object, the program causing a computer of the information processing apparatus to perform a process including the steps of calculating a characteristic amount for each of a plurality of n different image patterns, specifying a best-matching image pattern among the plurality of n image patterns for each of frames forming a learning moving picture and having temporal continuity, computing a collocation probability Pij indicating a probability that, for a frame located at a position where a temporal distance to a frame for which a first image pattern Xi is specified among the plurality of n image patterns is within a predetermined threshold τ, a second image pattern Xj is specified among the plurality of n image patterns, and grouping the plurality of n image patterns by using the computed collocation probability Pij.

In the embodiments of the present invention, a characteristic amount is calculated for each of a plurality of n different image patterns, a best-matching image pattern is specified among the plurality of n image patterns for each of frames forming a learning moving picture and having temporal continuity, a collocation probability Pij is computed indicating a probability that, for a frame located at a position where a temporal distance to a frame for which a first image pattern Xi is specified among the plurality of n image patterns is within a predetermined threshold τ, a second image pattern Xj is specified among the plurality of n image patterns, and the plurality of n image patterns are grouped by using the computed collocation probability Pij.

According to the embodiments of the present invention, patterns for image recognition can be optimally grouped. Also, according to the embodiments of the present invention, an object on an image can be recognized with high accuracy.

DESCRIPTION OF THE PREFERRED EMBODIMENTS

Preferred embodiments of the present invention (hereinafter referred to as embodiments) are described in detail below with reference to the drawings. Here, description is made according to the following sequence.

1. General Outline of an Embodiment of the Present Invention
2. Embodiment

1. General Outline of an Embodiment of the Present Invention

Figure 1:
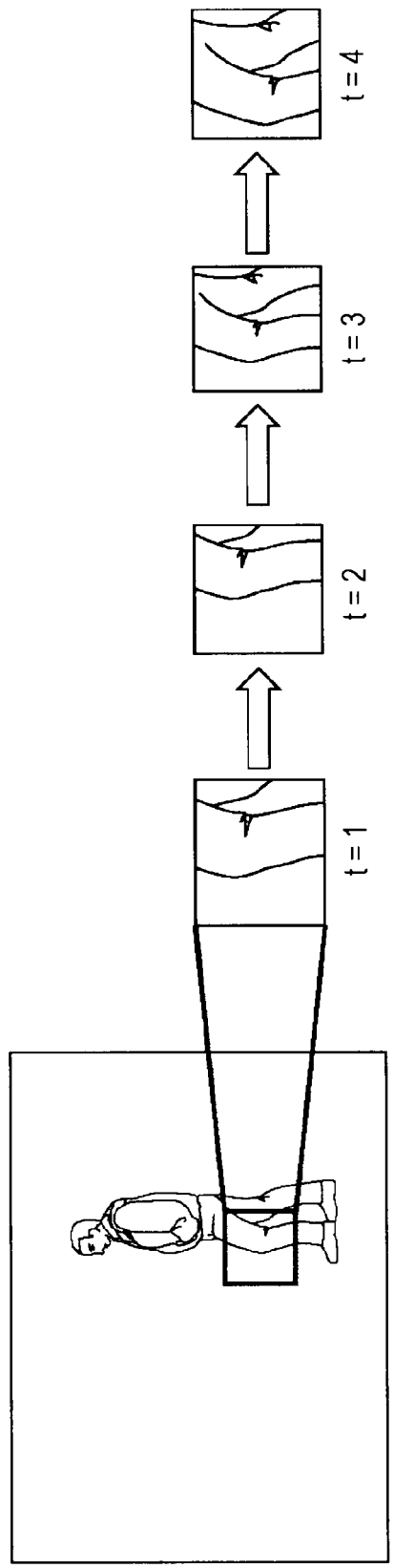
FIG. 1 is a diagram of an example of moving picture including an object to be recognized.
Figure 2:
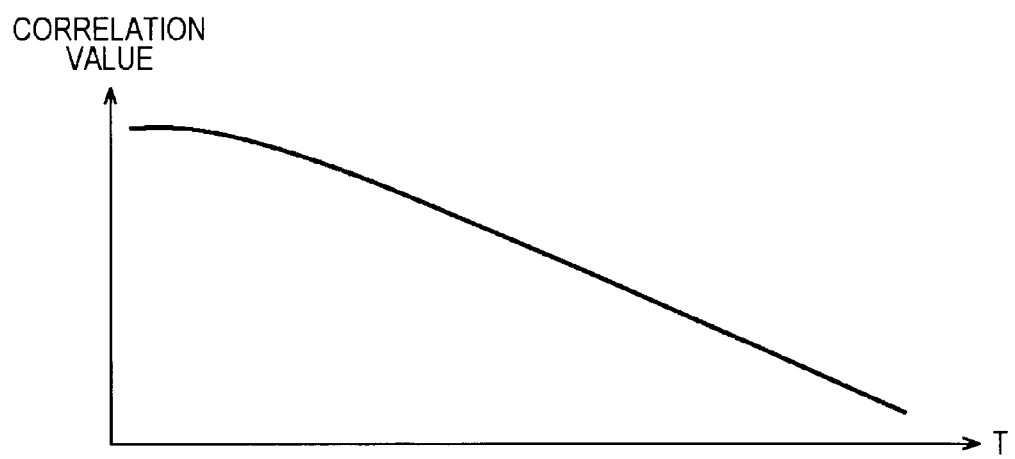
FIG. 2 is a diagram of a relation between a lapse of time and a correlation value corresponding to FIG. 1.
Figure 3:
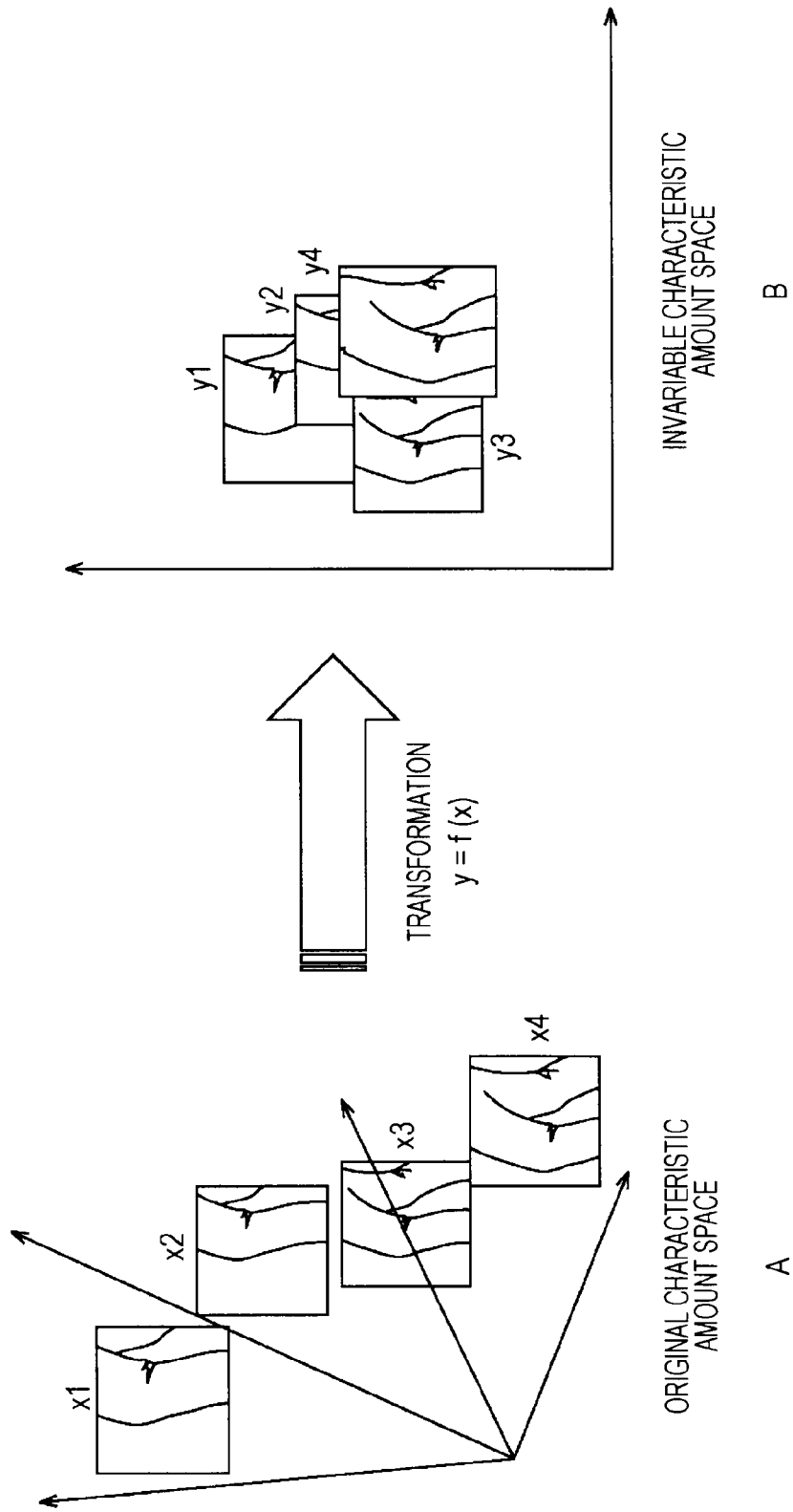
FIG. 3 is a diagram for describing an invariable characteristic amount space.
Figure 4:
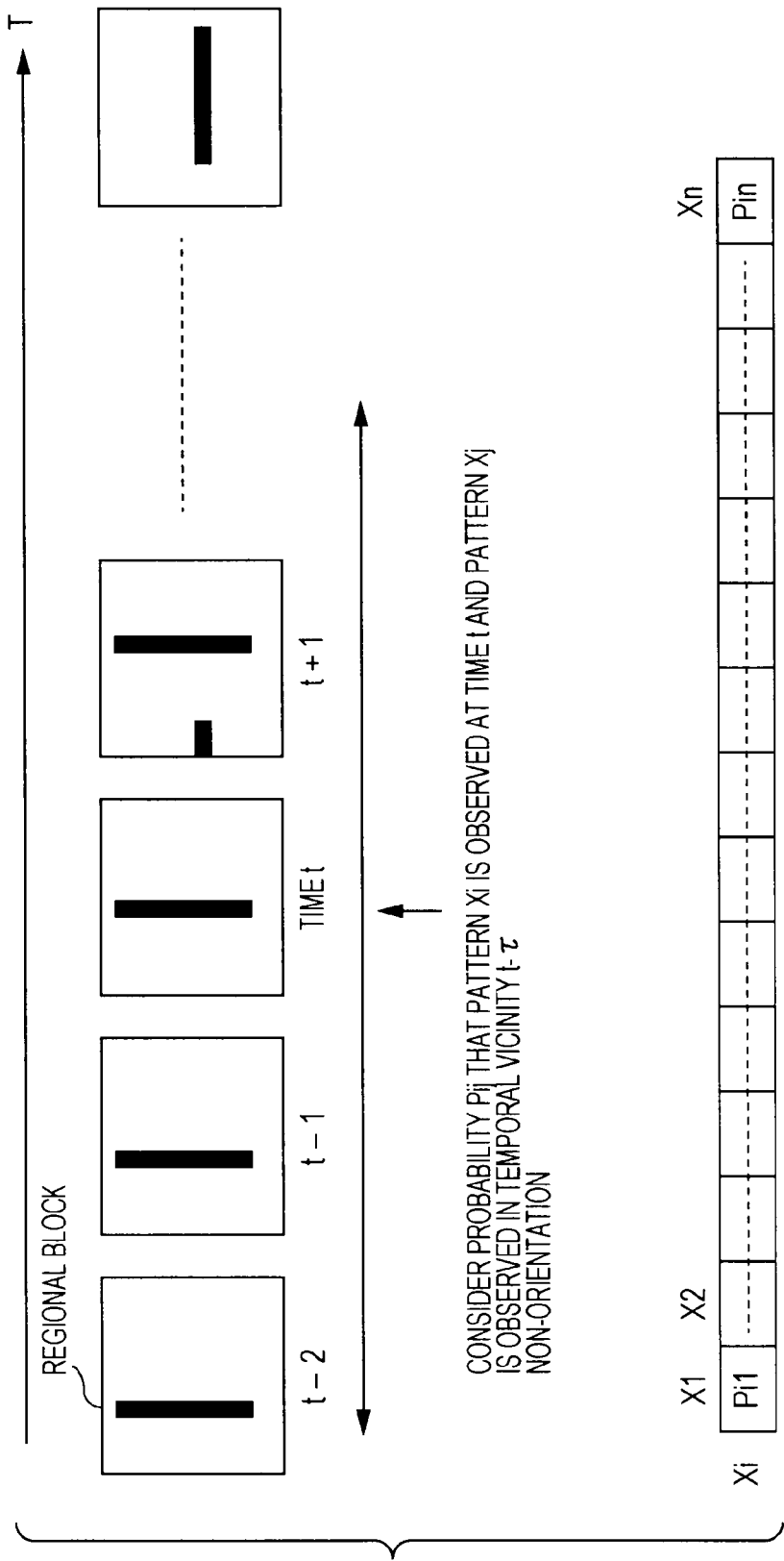
FIG. 4 is a drawing for describing a general outline of an embodiment of the present invention.
Figure 5:
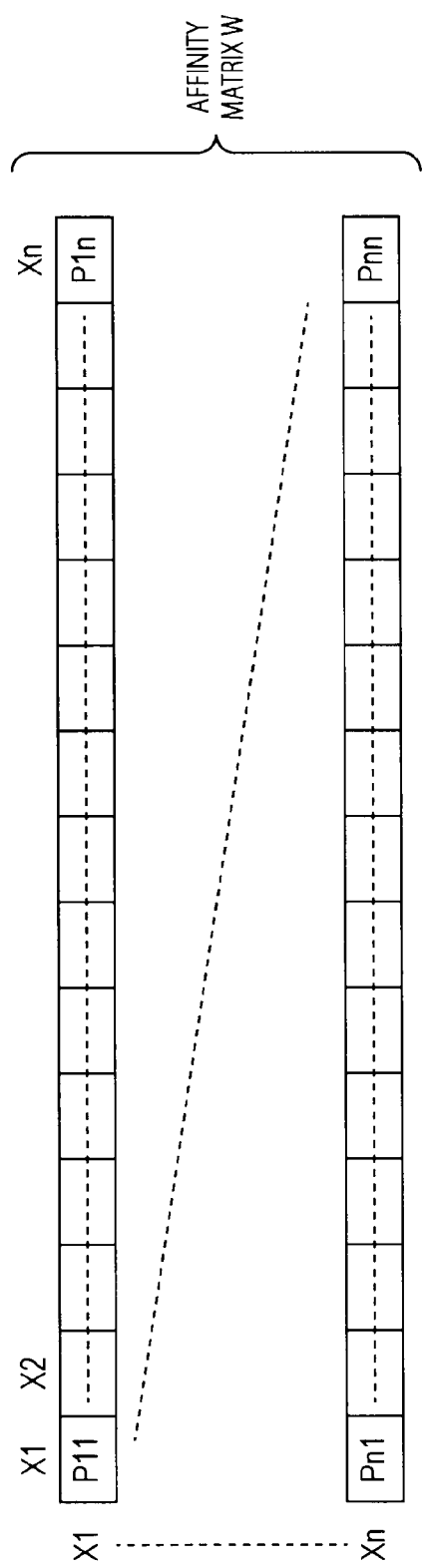
FIG. 5 is a diagram of an affinity matrix.
Figure 6:
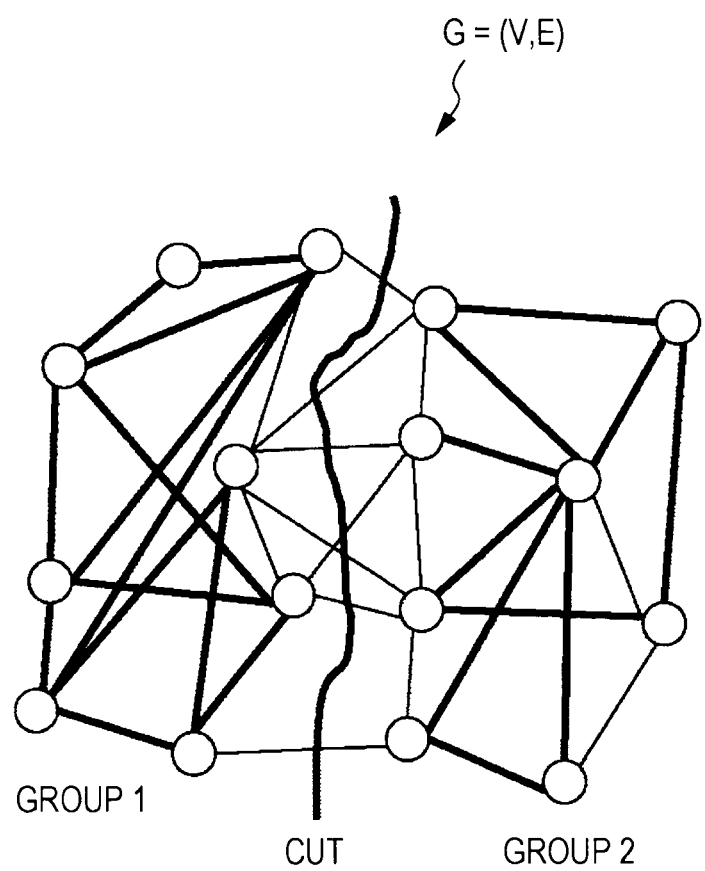
FIG. 6 is a graph geometrically representing the affinity matrix.

FIGS. 4 to 6 depict a general outline of a technique for automatically learning a group of patterns for recognizing an object that is present on a moving picture.

When an image in regional blocks each extracted from a predetermined position in successive frames of a moving picture makes a transition as depicted in FIG. 4, that is, when an object extending in a vertical direction moves in a right direction within a screen, any of n types of patterns is specified for a regional block at each time.

With a pattern specified for a regional block in a frame at a time t being taken as Xi, consider a collocation probability Pij (hereinafter simply referred to as a probability Pij) for which a pattern Xj is specified for a regional block in a frame from a time t−τ prior to the time t by a time period (temporal distance) τ to a time t+τ subsequent to the time t by the time period τ. The time period τ takes any value. This probability Pij is assumed to be obtained by counting the number of frames for which the pattern Xj is specified from the time t−τ to the time t+τ, with the time t when the pattern Xi is specified being taken at center. For this reason, the probability Pij takes a value equal to or larger than 0.

However, instead of simply counting the number of frames for which the pattern Xj is specified, counting may be performed after multiplication by a weighting coefficient in accordance with a temporal distance to the time t so that the counted number is larger as the time is temporally closer to the time t.

FIG. 5 depicts an affinity matrix W having the probability Pij obtained in this manner as an element.

Since there are n types of pattern, this affinity matrix W is a positive matrix of n×n. Also, the probability Pij, which is an element of the affinity matrix W, depends on a time interval between the pattern Xi and the pattern Xj, and does not depend on its time direction, and therefore the probability Pij is equal to a probability Pji. For this reason, the values of the respective elements in the affinity matrix W are symmetric with respect to a line connecting diagonal elements.

FIG. 6 depicts the affinity matrix W plotted into a geometrical graph G=(V, E). Each node in this graph G=(V, E) corresponds to each pattern, and the thickness of an edge corresponds to a probability. For example, the thickness of an edge connecting a node corresponding to the pattern Xi and a node corresponding to the pattern Xj corresponds to the probability Pij.

Therefore, grouping of n types of pattern is equivalent to grouping of the nodes in the graph G=(V, E) depicted in FIG. 6. For grouping of the nodes in the graph G=(V, E), existing techniques, such as graph cut or spectral clustering, can be used.

A condition of allowing spectral clustering to be applied to node grouping is that the edge has a positive weight (thickness) and a symmetric property of the probability Pij=the probability Pji holds. As described above, in the affinity matrix depicted in FIG. 5, the probability Pij has a value equal to or larger than 0, and also the probability Pij is equal to the probability Pji, and it can be therefore confirmed that spectral clustering can be applied. Therefore, in an embodiment described further below, n types of patterns are grouped by spectral clustering.

2. Embodiment

Example of Structure of the Image Recognizing Apparatus

Figure 7:
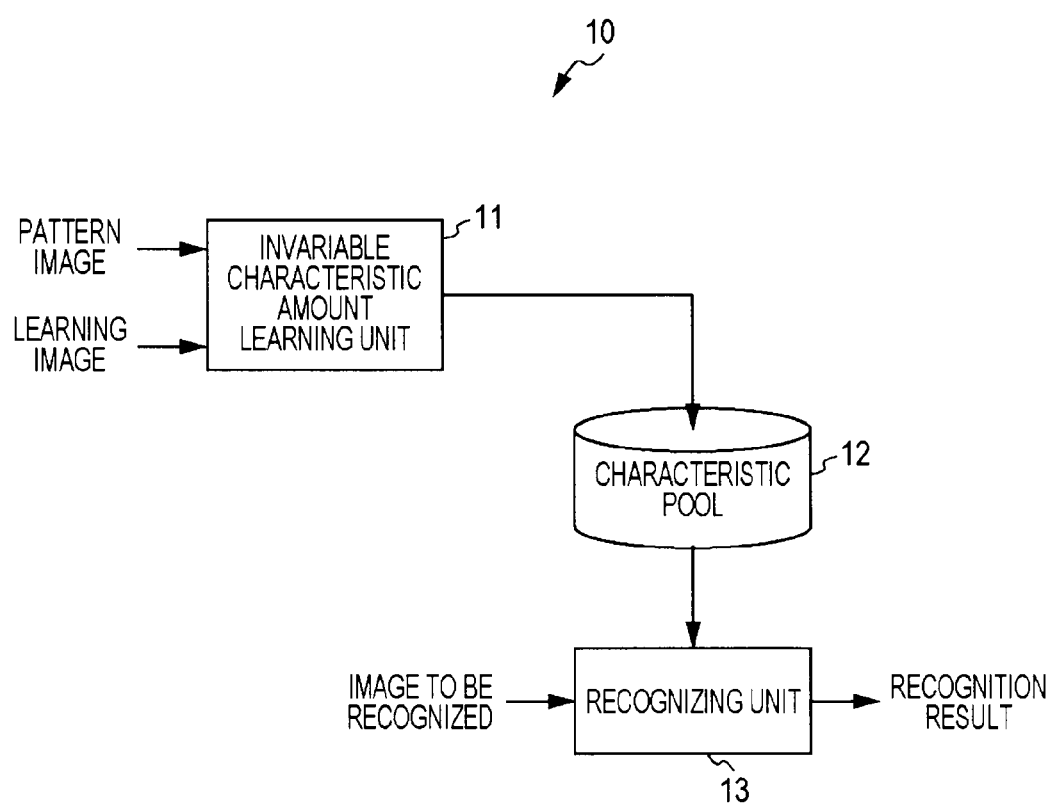
FIG. 7 is a block diagram of an example of structure of an image recognizing apparatus to which an embodiment of the present invention is applied.

FIG. 7 depicts an example of structure of an image recognizing apparatus of an embodiment of the present invention. This image processing apparatus 10 includes an invariable characteristic amount learning unit 11, a characteristic pool 12, and a recognizing unit 13.

The invariable characteristic amount learning unit 11 cuts out an input pattern image (a still picture) to generate n types of patterns, and also calculates a characteristic amount of each pattern and registers the characteristic amount in the characteristic pool 12. Also, the invariable characteristic amount learning unit 11 uses a learning image (a moving picture) to group n types of patterns registered in the characteristic pool 12.

In the characteristic pool 12, n types of patterns and their characteristic amounts are grouped and registered. Here, (a characteristic amount of) patterns classified into the same group represents an invariable characteristic amount.

The recognizing unit 13 calculates a characteristic amount of each regional block by dividing a frame of an input image (a moving picture) to be recognized into a plurality of regional blocks, and compares the calculated characteristic amount with each characteristic amount of n types of patterns registered in the characteristic pool 12 to specify a best-matching pattern for each regional block. Then, based on the specifying result and circumstances of grouping the patterns, the recognizing unit 13 recognizes an object on the image to be recognized, and then outputs the recognition result. Here, any existing method can be applied to the recognizing process by the recognizing unit 13. Also, in the recognizing unit 13, a still picture can be taken as an image to be recognized.

Figure 8:
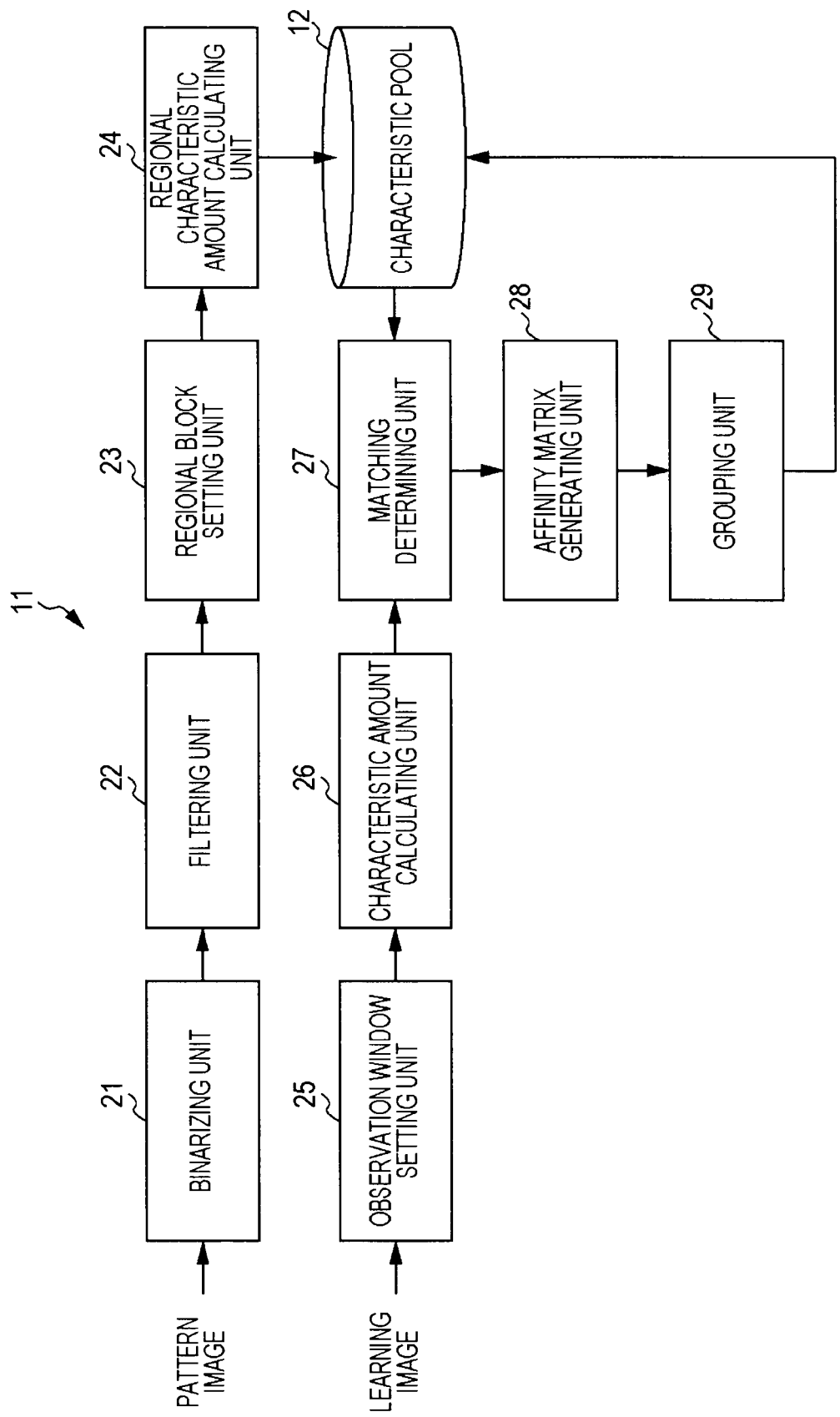
FIG. 8 is a block diagram of a detailed example of structure of an invariable characteristic amount learning unit of FIG. 7.

FIG. 8 depicts an example of detailed structure of the invariable characteristic amount learning unit 11 of FIG. 7. The invariable characteristic amount learning unit 11 includes a binarizing unit 21, a filtering unit 22, a regional block setting unit 23, a regional characteristic amount calculating unit 24, an observation window setting unit 25, a characteristic amount calculating unit 26, a matching determining unit 27, an affinity matrix generating unit 28, and a grouping unit 29.

Figure 9:
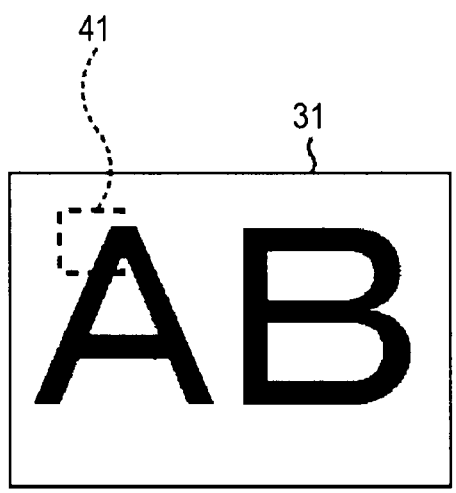
FIG. 9 is a drawing of an example of a pattern image.

The binarizing unit 21 binarizes pixels of an input pattern image for output to the filtering unit 22. As a pattern image, for example, as depicted in FIG. 9, a simple image of a matrix on the order of several tens of pixels by several tens of pixels can be used.

For example, by using a Gaussian smoothing filter or the like, the filtering unit 22 performs blurring on the binarized pattern image for output to the regional block setting unit 23.

The regional block setting unit 23 sets a plurality of n regional blocks (for example, 4×4 pixels) at a random position on the binarized and blurred pattern image, and extracts an area of each regional block for output to the regional characteristic amount calculating unit 24. The regional characteristic amount calculating unit 24 regards an area of the binarized and blurred pattern image extracted from each regional block as one pattern, and calculates its characteristic amount for output to the characteristic pool 12 for registration. Here, as a method of calculating a regional characteristic amount, any existing calculating method can be used. With this, in the characteristic pool 12, a characteristic amount in association with a relevant one of n types of patterns is registered.

Figure 10:
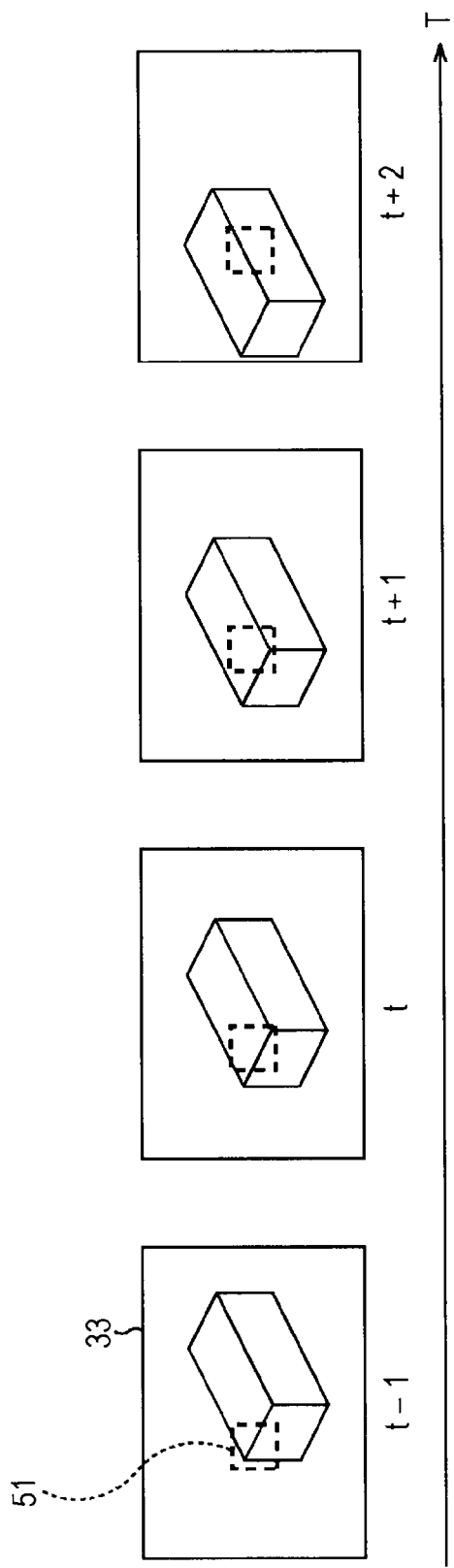
FIG. 10 is a diagram of an example of a learning image.

The observation window setting unit 25 sets an observation window of a predetermined size at a predetermined fixed position in each frame of a learning image (a moving picture), extracts an area of each observation window for output to the characteristic amount calculating unit 26. As a learning image, for example, as depicted in FIG. 10, an image in which any existing object is taken as a subject can be used.

The characteristic amount calculating unit 26 calculates a characteristic amount of the area of each frame of the learning image extracted from each observation window through a characteristic amount calculating method similar to that for use in the regional characteristic amount calculating unit 24, and then outputs the calculated characteristic amount to the matching determining unit 27.

Based on the characteristic amount of the area of the observation window of each frame of the learning image, the matching determining unit 27 specifies best-matching one of n types of patterns registered in the characteristic pool 12 for output to the affinity matrix generating unit 28.

Based on the pattern specified with respect to the observation window in each frame of the learning image, the affinity matrix generating unit 28 generates the affinity matrix W of n×n with the probability Pij as an element for output to the grouping unit 29.

Based on the input affinity matrix W, the grouping unit 29 uses spectral clustering to group n types of patterns, and notifies the characteristic pool 12 of the result. With this, the n types of patterns registered in the characteristic pool 12 are grouped. Here, (a characteristic amount of) patterns classified into the same group represents an invariable characteristic amount.

Here, grouping of n types of patterns using spectral clustering by the grouping unit 29 is described.

Figure 11:
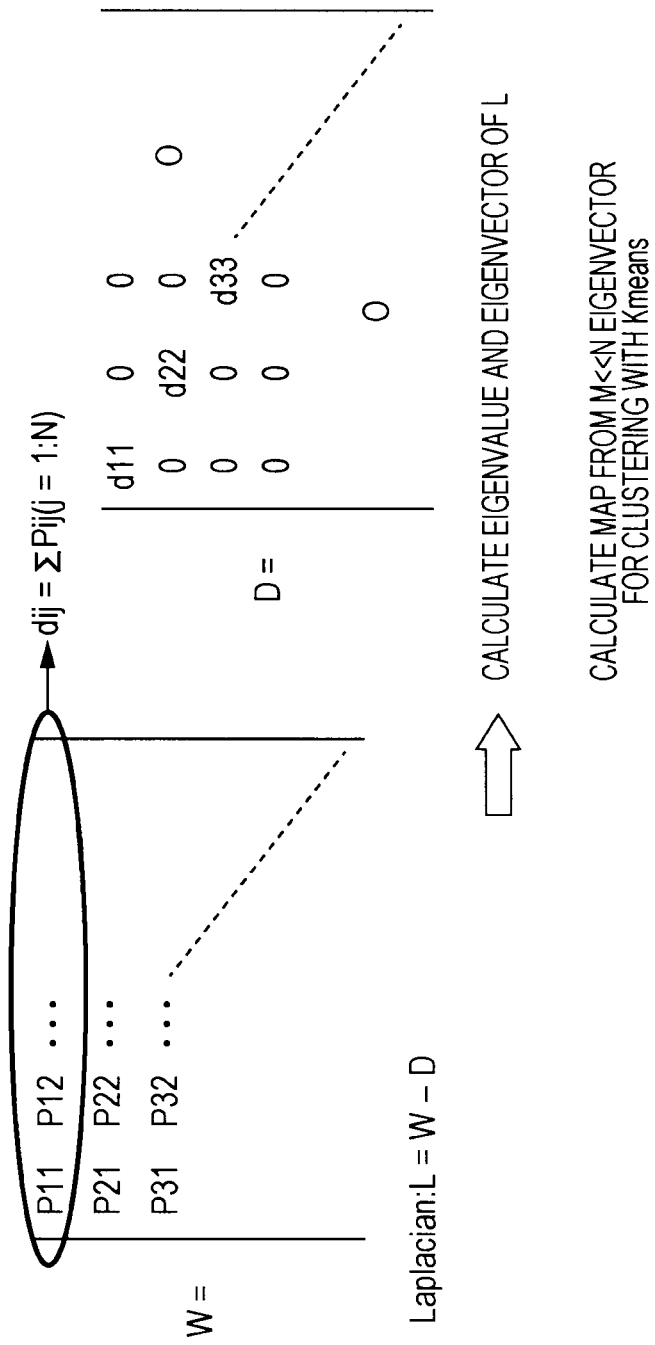
FIG. 11 is a diagram for describing spectral clustering.

FIG. 11 depicts a general outline of spectral clustering. First, each row is multiplied by the probability Pij, which is an element of the affinity matrix W, and the multiplication result is taken as a value of its diagonal element, thereby generating a matrix D of n×n. Next, the matrix D is subtracted from the affinity matrix W to calculate a Laplacian L=W−D. Next, an eigenvalue and an eigenvector of the Laplacian L is calculated, a map is calculated from M<< n eigenvectors, and the result is then subjected to clustering by the Kmeans method, thereby grouping n types of patterns into a plurality of groups.

Here, the procedure of spectral clustering by the grouping unit 29 is not meant to be restricted to the one described above, and spectral clustering may be performed according to any procedure. Also, in the grouping unit 29, n types of patterns may be grouped by a method other than spectral clustering, for example, the Kmeans method.

Description of the Operation

Figure 12:
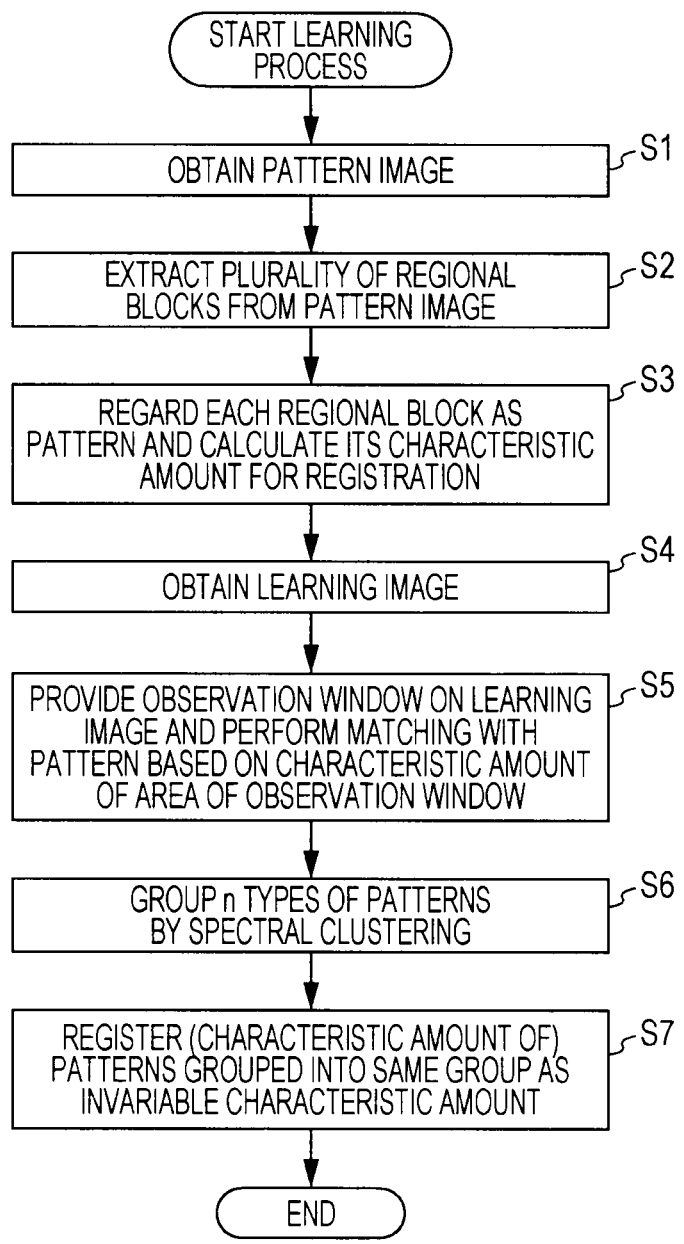
FIG. 12 is a flowchart for describing a learning process.

Next, a learning process by the invariable characteristic amount learning unit 11 is described. FIG. 12 is a flowchart for describing the learning process.

At step S1, the invariable characteristic amount learning unit 11 obtains a pattern image. This pattern image is input to the binarizing unit 21.

At step S2, the binarizing unit 21 binarizes the pixels of the pattern image for output to the filtering unit 22. The filtering unit 22 performs blurring on the binarized pattern image for output to the regional block setting unit 23. The regional block setting unit 23 sets a plurality of n regional blocks at a random position on the binarized and blurred pattern image, and extracts an area of each regional block for output to the regional characteristic amount calculating unit 24.

At step S3, the regional characteristic amount calculating unit 24 regards the area of the binarized and blurred pattern image extracted from each regional block as one pattern, and calculates its characteristic amount for output to the characteristic pool 12 for registration.

At step S4, the invariable characteristic amount learning unit 11 obtains a learning image. This learning image is input to the observation window setting unit 25.

At step S5, the observation window setting unit 25 sets an observation window of a predetermined size at a predetermined fixed position in each frame of the learning image (a moving picture), and extracts an area of each observation window for output to the characteristic amount calculating unit 26. The characteristic amount calculating unit 26 calculates a characteristic amount of the area of each frame of the learning image extracted from each observation window for output to the matching determining unit 27. Based on the characteristic amount of the area of the observation window of each frame of the learning image, the matching determining unit 27 specifies best-matching one of n types of patterns registered in the characteristic pool 12 for output to the affinity matrix generating unit 28.

Based on the pattern specified with respect to the observation window of each frame of the learning image, the affinity matrix generating unit 28 generates the affinity matrix W for output to the grouping unit 29. Specifically, for example, the frames of the learning image are sequentially set as a reference frame. Then, a pattern specified for the observation window of the reference frame is taken as the pattern $X_i$, and the number of frames for which the pattern $X_j$ is specified among frames having a temporal distance with the reference frame within the time period $\tau$ is counted to compute the probability $P_{ij}$ for multiplication. With thus obtained probability $P_{ij}$ being as an element, the affinity matrix W is generated.

At step S6, based on the input affinity matrix X, the grouping unit 29 uses spectral clustering to group n types of patterns, and notifies the characteristic pool 12 of the grouping result. At step S7, the characteristic pool 12 also registers the grouping result of the registered n types of patterns. (A characteristic amount of) patterns classified into the same group represents an invariable characteristic amount. The registering process now ends.

At step S4 of the registering process described above, by using a learning image of a longer time, a high learning effect can be obtained. That is, appropriate grouping can be expected to be performed.

In the characteristic pool 12 that learned as described above, n types of patterns are grouped, that is, they are registered as an invariable characteristic amount. Therefore, by using this invariable characteristic amount when an object on a moving picture is recognized, the object on the moving picture can be identified with high accuracy even when the object makes complex motions. Also, an object on a still picture can be identified with high accuracy.

Meanwhile, the series of processes described above can be executed by hardware and also by software. When the series of processes are executed by software, a program that configures the software is installed from a program recording medium to a computer incorporated in dedicated hardware or, for example, a general-purpose personal computer capable of executing various functions when various programs are installed.

Figure 13:
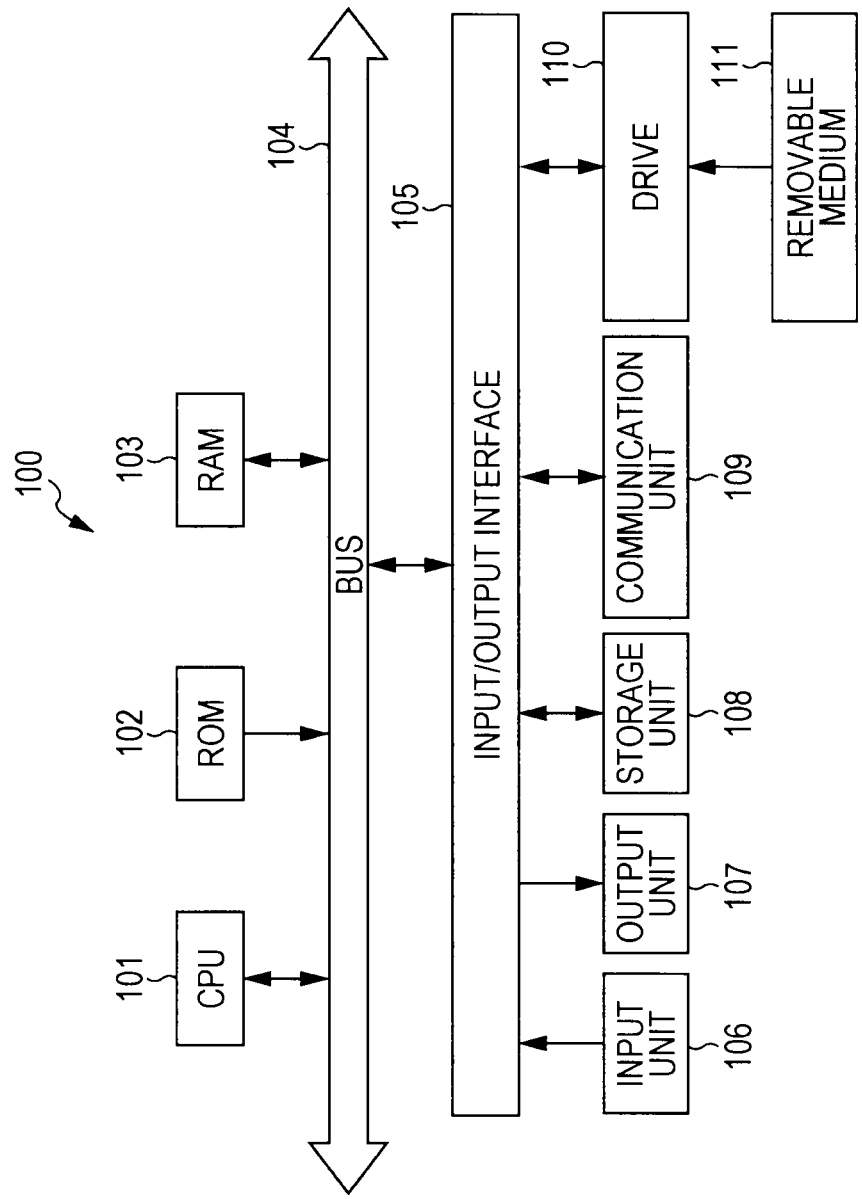
FIG. 13 is a block diagram of an example of structure of a computer.

FIG. 13 is a block diagram of an example of hardware structure of a computer that executes the series of processes described above with a program.

In this computer 100, a central processing unit (CPU) 101, a read only memory (ROM) 102, and a random access memory (RAM) 103 are mutually connected to each other by a bus 104.

To the bus 104, an input/output interface 105 is further connected. To the input/output interface 105, an input unit 106 formed of a keyboard, a mouse, a microphone, and others, an output unit 107 formed of a display, a loudspeaker, and others, a storage unit 108 formed of a hard disk, a non-volatile memory, and others, a communicating unit 109 formed of a network interface and others, and a drive 110 driving a removable medium 111, such as a magnetic disk, an optical disk, an magneto-optical disk, or a semiconductor memory, are connected.

In the computer 100 configured as above, the series of processes described above is performed by the CPU 101 loading a program stored in the storage unit 108 via the input/output interface 105 and the bus 104 into the RAM 103 for execution.

Here, the program to be executed by the computer may be a program causing processes to be performed in time series according to the order described in the specification, a program causing processes to be performed in parallel, or a program causing processes to be performed at a timing, such as when a call is issued.

Also, the program may be processed by one computer or a plurality of computers for distributed processing. Furthermore, the program may be transferred to a remote computer for execution.

The present application contains subject matter related to that disclosed in Japanese Priority Patent Application JP 2010-051361 filed in the Japan Patent Office on Mar. 9, 2010, the entire contents of which are hereby incorporated by reference.

Embodiments of the present invention are not meant to be restricted to the embodiments described above, and can be variously modified within a scope not deviating the gist of the present invention.

What is claimed is:

1. An information processing apparatus comprising:

characteristic amount calculating means for calculating a characteristic amount for each of a plurality of n different image patterns;

specifying means for specifying a best-matching image pattern among the plurality of n image patterns for each of frames forming a learning moving picture and having temporal continuity;

computing means for computing a collocation probability $P_{ij}$ indicating a probability that, for a frame located at a position where a temporal distance to a frame for which a first image pattern $X_i$ is specified among the plurality of n image patterns is within a predetermined threshold $\tau$, a second image pattern $X_j$ is specified among the plurality of n image patterns; and grouping means for grouping the plurality of n image patterns by using the computed collocation probability $P_{ij}$.

2. The information processing apparatus according to claim 1, wherein the computing means computes the collocation probability Pij by sequentially setting each of the frames of the learning moving picture as a reference frame, taking an image pattern specified for the reference frame as the first image pattern Xi, counting a number of frames for which the second image pattern Xj is specified among a plurality of frames positioned within a temporal distance equal to or smaller than the predetermined threshold τ before and after the reference frame, and totalizing the counted value every time the reference frame is reset.

3. The information processing apparatus according to claim 2, wherein the computing means computes the collocation probability Pij by sequentially setting each of the frames of the learning moving picture as a reference frame, taking an image pattern specified for the reference frame as the first image pattern Xi, counting a number of frames for which the second image pattern Xj is specified among a plurality of frames positioned within a temporal distance equal to or smaller than the predetermined threshold τ before and after the reference frame by weighting according to a temporal distance to the reference frame, and totalizing the counted value as being weighted every time the reference frame is reset.

4. The information processing apparatus according to claim 2, wherein the grouping means groups the plurality of n image patterns by applying spectral clustering to the computed collocation probability Pij.

5. The information processing apparatus according to claim 2, further comprising image pattern generating means for generating the plurality of n image patterns by extracting a regional block of a predetermined size from a plurality of n different positions of a pattern image.

6. The information processing apparatus according to claim 2, further comprising recognizing means for specifying a best-matching image pattern for an image to be recognized among the grouped plurality of n image patterns and recognizing an object on the image to be recognized based on the specifying result.

7. An information processing method for an information processing apparatus grouping image patterns corresponding to a same object, the method comprising the steps of:
by the information processing apparatus,
calculating a characteristic amount for each of a plurality of n different image patterns;
specifying a best-matching image pattern among the plurality of n image patterns for each of frames forming a learning moving picture and having temporal continuity;
computing a collocation probability Pij indicating a probability that, for a frame located at a position where a temporal distance to a frame for which a first image pattern Xi is specified among the plurality of n image patterns is within a predetermined threshold τ, a second image pattern Xj is specified among the plurality of n image patterns; and
grouping the plurality of n image patterns by using the computed collocation probability Pij.

8. A non-transitory computer readable medium storing a program for controlling an information processing apparatus grouping image patterns corresponding to a same object, the program causing a computer of the information processing apparatus to perform a process comprising the steps of:
calculating a characteristic amount for each of a plurality of n different image patterns;
specifying a best-matching image pattern among the plurality of n image patterns for each of frames forming a learning moving picture and having temporal continuity;
computing a collocation probability Pij indicating a probability that, for a frame located at a position where a temporal distance to a frame for which a first image pattern Xi is specified among the plurality of n image patterns is within a predetermined threshold τ, a second image pattern Xj is specified among the plurality of n image patterns; and
grouping the plurality of n image patterns by using the computed collocation probability Pij.

9. An information processing apparatus comprising:
a characteristic amount calculating unit calculating a characteristic amount for each of a plurality of n different image patterns;
a specifying unit specifying a best-matching image pattern among the plurality of n image patterns for each of frames forming a learning moving picture and having temporal continuity;
a computing unit computing a collocation probability Pij indicating a probability that, for a frame located at a position where a temporal distance to a frame for which a first image pattern Xi is specified among the plurality of n image patterns is within a predetermined threshold τ, a second image pattern Xj is specified among the plurality of n image patterns; and
a grouping unit grouping the plurality of n image patterns by using the computed collocation probability Pij.

* * * * *